United States Patent
Schönfeld

(10) Patent No.: US 6,220,281 B1
(45) Date of Patent: Apr. 24, 2001

(54) REGULATOR FOR USE WITH APPARATUS HAVING A HYDROSTATIC OR AEROSTATIC POCKET

(76) Inventor: Robert Schönfeld, Gemeindeländerweg 23, 73095, Albershausen (DE)

( * ) Notice: Subject to any disclaimer, the term of this patent is extended or adjusted under 35 U.S.C. 154(b) by 0 days.

(21) Appl. No.: 09/502,845

(22) Filed: Feb. 11, 2000

Related U.S. Application Data

(62) Division of application No. 08/963,431, filed on Nov. 3, 1997, now Pat. No. 6,076,548.

(30) Foreign Application Priority Data

Nov. 5, 1996 (DE) .............................................. 196 45 535

(51) Int. Cl.$^7$ .................................................. F16K 31/12
(52) U.S. Cl. ............................ 137/501; 184/7.3; 251/117
(58) Field of Search ..................................... 137/501, 503; 251/117; 184/7.3

(56) References Cited

U.S. PATENT DOCUMENTS

| 2,659,384 | * | 11/1953 | Lowe .................................. | 251/117 |
| 2,938,756 | * | 5/1960 | Loeb .................................. | 137/501 |
| 2,955,614 | * | 10/1960 | Meynig ........................... | 251/117 X |
| 3,047,005 | * | 6/1962 | Karr .................................. | 137/501 |
| 3,570,522 | * | 3/1971 | Horsch et al. ....................... | 137/501 |
| 4,113,325 | | 9/1978 | Miller ...................................... | 308/9 |
| 4,694,852 | * | 9/1987 | Grant .................................. | 137/501 |
| 4,776,367 | * | 10/1988 | Hilmersson et al. ................ | 137/501 |
| 4,922,956 | * | 5/1990 | Taube, Sr. et al. ................. | 137/504 |
| 5,123,506 | * | 6/1992 | Sirven .................................. | 188/280 |

FOREIGN PATENT DOCUMENTS

| 1 944 433 | 4/1970 | (DE) | ............................... | F16C/17/16 |
| 21 02 110 | 7/1972 | (DE) | ............................... | F16N/29/04 |
| 24 56 032 | 5/1975 | (DE) | ............................... | F16C/32/06 |
| 31 50 117 | 7/1983 | (DE) | ............................... | F16C/32/06 |
| 33 38075 | 3/1984 | (DE) . | | |
| 35 33 037 | 12/1986 | (DE) | ............................... | F16C/32/06 |
| 0 099 180 | 1/1984 | (EP) . | | |
| 0 392 946 | 11/1990 | (EP) | ............................... | F16C/32/06 |
| 2 122 273 | 1/1984 | (GB) . | | |

OTHER PUBLICATIONS

*Soviet Inventions Illustrated*, Section PQ, Week 8606, Mar. 8, 1986, Derwent Publications Ltd., London, Great Britain.
*Soviet Inventions Illustrated*, Section PQ, Week 8509, Apr. 10, 1985, Derwent Publications Ltd., London, Great Britain.

* cited by examiner

Primary Examiner—Stephen M. Hepperle
(74) Attorney, Agent, or Firm—Fitch, Even, Tabin & Flannery

(57) ABSTRACT

The invention pertains to a regulator for regulating a medium flow to at least one hydrostatic or aerostatic pocket of a bearing, a nut for threaded spindles or a guidance from a medium supply, with pressure chambers that are separated by a variable flow resistance control element that can be moved against the force of a spring element. A first pressure chamber is directly connected to the medium supply, a second pressure chamber that is charged with a lower pressure level is connected to the medium supply via a first flow resistance, and a third pressure chamber is charged with a third pressure level that corresponds to the pressure in the hydrostatic or aerostatic pocket.

7 Claims, 4 Drawing Sheets

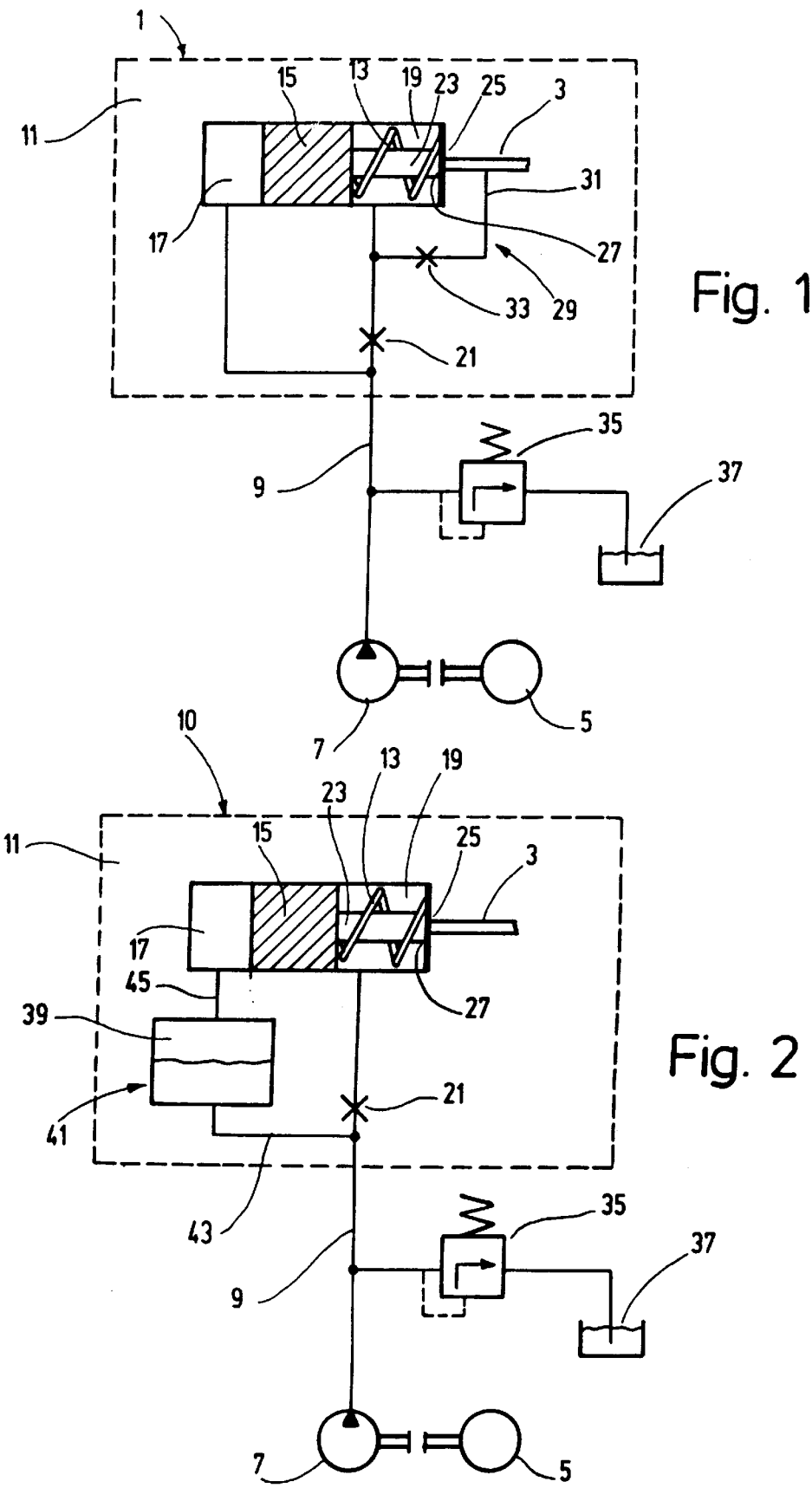

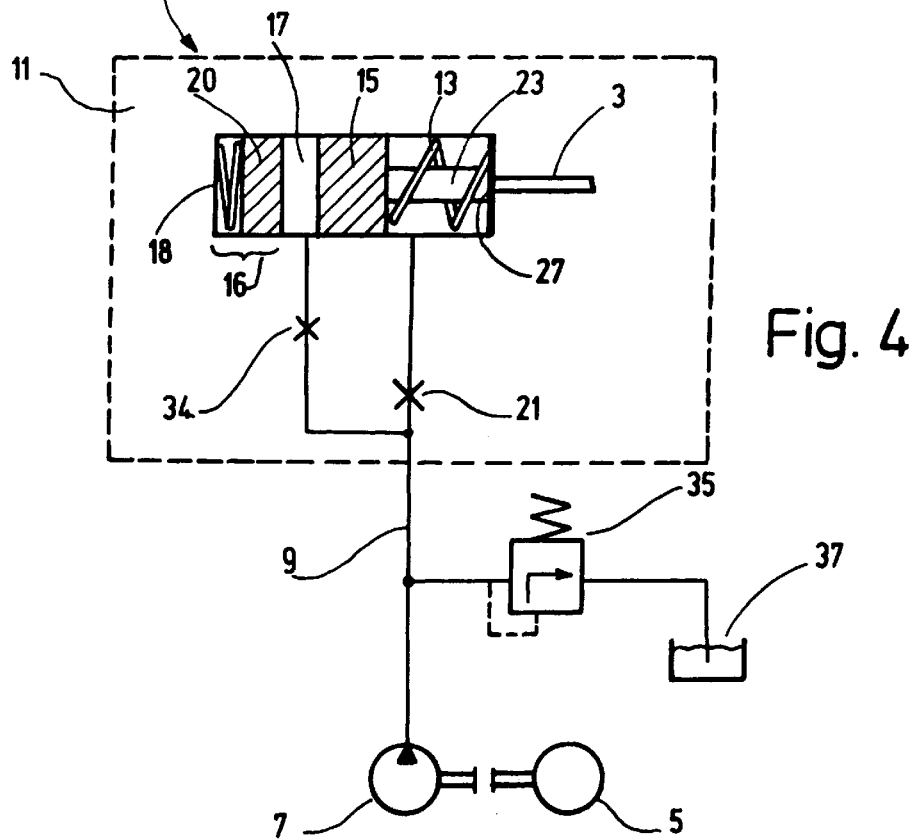

REGULATOR FOR USE WITH APPARATUS HAVING A HYDROSTATIC OR AEROSTATIC POCKET

This is a division of prior application Ser. No. 08/963,431, filed Nov. 3, 1997, now U.S. Pat. No. 6,076,548, which is hereby incorporated herein by reference in its entirety.

BACKGROUND OF THE INVENTION

1. Field Of The Invention

The invention pertains to a regulator for regulating a medium flow that is supplied to at least one static fluid (e.g., hydrostatic or aerostatic) pocket of a bearing, a nut for threaded spindles or a guidance arrangement.

2. Description Of The Related Art

Regulators of this type for regulating fluid flows are known (DE 3,533,037 C1). In this case, the fluid flow that is influenced by the regulator increases if the pressure in the hydrostatic pocket increases. In hydrostatic bearings, nuts for threaded spindles or guidances which cooperate with regulators of the above-mentioned type, the attainable stiffness and stress of these elements is significantly higher than in alternative systems under comparable technical circumstances. The flow-through quantity Q is proportional to the third power of the gap height or the height h of the gap of the pocket, through which the medium flows. With laminar flow, the condition $Q \sim p \times h^3/\eta$ applies, where $\eta$ refers to the dynamic viscosity of the medium or the fluid. This applies similarly to gaseous media. The previously described relation indicates that a change in the height h due to a pressure change in the hydrostatic pocket caused by an increase in the fluid flow or the flow-through quantity Q can be reduced or practically eliminated. Consequently, if a hydrostatic pocket is stressed such that the pressure in this hydrostatic pocket is increased, a change in the gap height and consequently a displacement of the guided or supported parts can be counteracted by increasing the fluid flow that flows into the hydrostatic pocket via the regulator. This results in increased stiffness.

It was determined that known regulators with a variable second flow resistance, e.g., a throttle, that comprises a control element tend to extremely disturbing vibrations under certain operating conditions, in particular, at relatively large fluid flow quantities, fluids with a low viscosity, as they are primarily required for rapidly revolving bearings, as well as at relatively low pressures in the corresponding hydrostatic pocket.

The present invention is based on the objective of developing a regulator for liquid as well as gaseous media which eliminates this disadvantage.

According to the invention, this objective is attained with a regulator that is realized in accordance with the characteristics which include a bypass that is connected to the hydrostatic or aerostatic pocket which is simply referred to as the pocket below, and to the medium supply that supplies the pocket via the regulator by means of a first flow resistance.

The bypass is provided with a third flow resistance. This means that the pocket is supplied with two medium flows, namely a first partial flow that is influenced by a control element of the regulator which acts as a variable second flow resistance, and a second partial flow that is conveyed via the bypass. The second medium flow that flows through the bypass reduces the first medium flow that flows through the variable second flow resistance to a fraction of the value that can be attained without a bypass, in particular, at low pressures in the hydrostatic or aerostatic pocket and at the regulator output. Due to this measure, the relative changes of the partial medium flow caused by the variable sectioned flow resistance are significantly increased during a change of the medium flow caused by the regulator due to different pressures in the hydrostatic or aerostatic pocket, in particular, at low pressures in the hydrostatic or aerostatic pocket. Due to the previously described mathematical correlation which at least approximately applies also to the control element that acts as the variable second flow resistance, the control element carries out greater control movements and consequently affects the medium flow less strongly. Due to the bypass, the control element carries out greater control movements—in particular, at low pressures in the hydrostatic or aerostatic pocket—such that the first partial flow that flows to the pocket is not influenced as directly, i.e., the tendency to vibrate is reduced.

Another embodiment of the regulator has a third flow resistance which is arranged in the bypass and which is designed for or adjusted to a medium flow that approximately corresponds to the medium flow that flows through the regulator if the pressure at the regulator output is equal to zero. Thus, the flow through the variable second flow resistance of the regulator—at the regulator output pressure in this operating mode—also becomes equal to zero or at least very low. In this embodiment, the bypass increases, in particular, the control movements of the control element that acts as the variable second flow resistance within the range of low pressures in the hydrostatic or aerostatic pocket which is particularly susceptible to vibrations, i.e., the tendency of the regulator to vibrate is reduced.

In order to attain other desirable objectives, a regulator is proposed for regulating liquid media. This regulator comprises three pressure chambers that are separated by the control element, wherein a first pressure chamber is connected to a gas volume. The control element is charged with the pressure of the medium supply, with a second pressure that acts in the second pressure chamber via the first flow resistance as well as a third pressure that acts in the third pressure chamber via the variable second flow resistance. Due to the connection between the first pressure chamber and a gas volume, pressure pulsations in the connecting line from the pump to the regulator act, if at all, upon the first pressure chamber only minimally. Due to the compressibility of the gas volume during dynamic pressure changes, the control element is, in particular, able to dynamically yield in the second as well as the first pressure chamber. This measure also reduces the tendency of the regulator to vibrate.

Another embodiment of the regulator is disclosed for use with liquid media. In this case, the gas volume in the first pressure chamber is situated directly adjacent to the control element or only separated from the control element by an elastic sealing element, wherein the gas volume is connected to an additional gas chamber that, for example, is situated on the gas side of a hydraulic accumulator, the fluid side of which is directly connected to the pump that supplies the hydrostatic pocket.

When the pump is switched on, the gas volume in the first pressure chamber and in the additional gas chamber is compressed to the pump pressure. When the pump is switched off, the gas volume in the first pressure chamber and in the additional gas chamber is adjusted to a pressure that lies slightly below the pump pressure, which reduces the heating of the gas which occurs during the compression of the gas when the pump is switched on. A direct connection between the pump and the first pressure chamber is not required in this embodiment of the regulator.

Since the gas volume can be compressed, the control element can easily move in the direction of the gas volume in the first pressure chamber during a pressure shock in the pocket and thus increase the fluid flow to the pocket. Due to the increased mobility, larger control movements are attained, i.e., problems caused by vibrations are prevented.

The aforementioned objective is also attained with a regulator having a first pressure chamber which is filled with a fluid and connected to the medium supply that supplies the hydrostatic pocket via a fourth flow resistance, where the first pressure chamber is so large that the fluid contained therein dampens vibrations of the control element due to its compressibility. Due to this compressibility of the fluid in the first pressure chamber and the fourth flow resistance, vibrations in the first pressure chamber caused by vibrations in the medium supply are at least reduced. In addition, the control element is able to yield dynamically in the second pressure chamber and the first pressure chamber during dynamic pressure changes such that a low tendency of the regulator to vibrate is attained. These measures make it possible to attain a sufficient damping of the regulator vibrations without a gas filling in many instances.

The aforementioned objective is also attained with a regulator in which a first pressure chamber is separated from the surrounding atmosphere or a gas-filled chamber, the pressure of which is smaller or equal to the pressure of the medium supply, by an elastic spring element, wherein the first pressure chamber is also separated from the medium supply by a fourth flow resistance. Due to the resilience of the spring element that essentially consists of an elastic plate, the control element is able to yield dynamically in the second pressure chamber and the third pressure chamber during dynamic pressure changes, i.e., the pressure pulsations in the second and third pressure chamber are reduced or practically eliminated. In addition, vibrations in the first pressure chamber caused by pressure pulsations in the medium supply are prevented by the fourth flow resistance arranged between the first pressure chamber and the medium supply.

The aforementioned objective is also attained with a regulator for gaseous media which comprises three pressure chambers that are separated by a control element, wherein a first pressure chamber that is situated directly adjacent to the control element or only separated from the control element by an elastic sealing element is filled with a fluid, and wherein the first pressure chamber is connected to an additional chamber that is filled with fluid via a fluid-filled connecting line. The additional chamber that is filled with fluid is, for example, situated on the fluid side of a hydraulic accumulator, the gas side of which is directly connected to the medium supply. Due to the fluid volume in the first pressure chamber, the control element is prevented from carrying out rapid movements. Consequently, this embodiment of a regulator for regulating gaseous media is less susceptible to vibrations. A direct connection between the medium supply and the first pressure chamber is not required in this embodiment of the regulator.

Embodiments of the regulator in which the control element is realized in the form of a resilient—preferably round—elastic plate are particularly preferred. Regulators of this type have a relatively simple and compact design and can be easily realized.

BRIEF DESCRIPTION OF THE DRAWINGS

The invention is described in detail below with reference to the following figures:

FIG. 1 is a hydraulic diagram of a first embodiment of a regulator for liquid or gaseous media;

FIG. 2 is a hydraulic diagram of a second embodiment of a regulator for liquid or gaseous media;

FIG. 3 is a hydraulic diagram of a third embodiment of a regulator for liquid media;

FIG. 4 is a hydraulic diagram of a fourth embodiment of a regulator for liquid media;

DETAILED DESCRIPTION OF THE PREFERRED EMBODIMENTS

Figure 5:
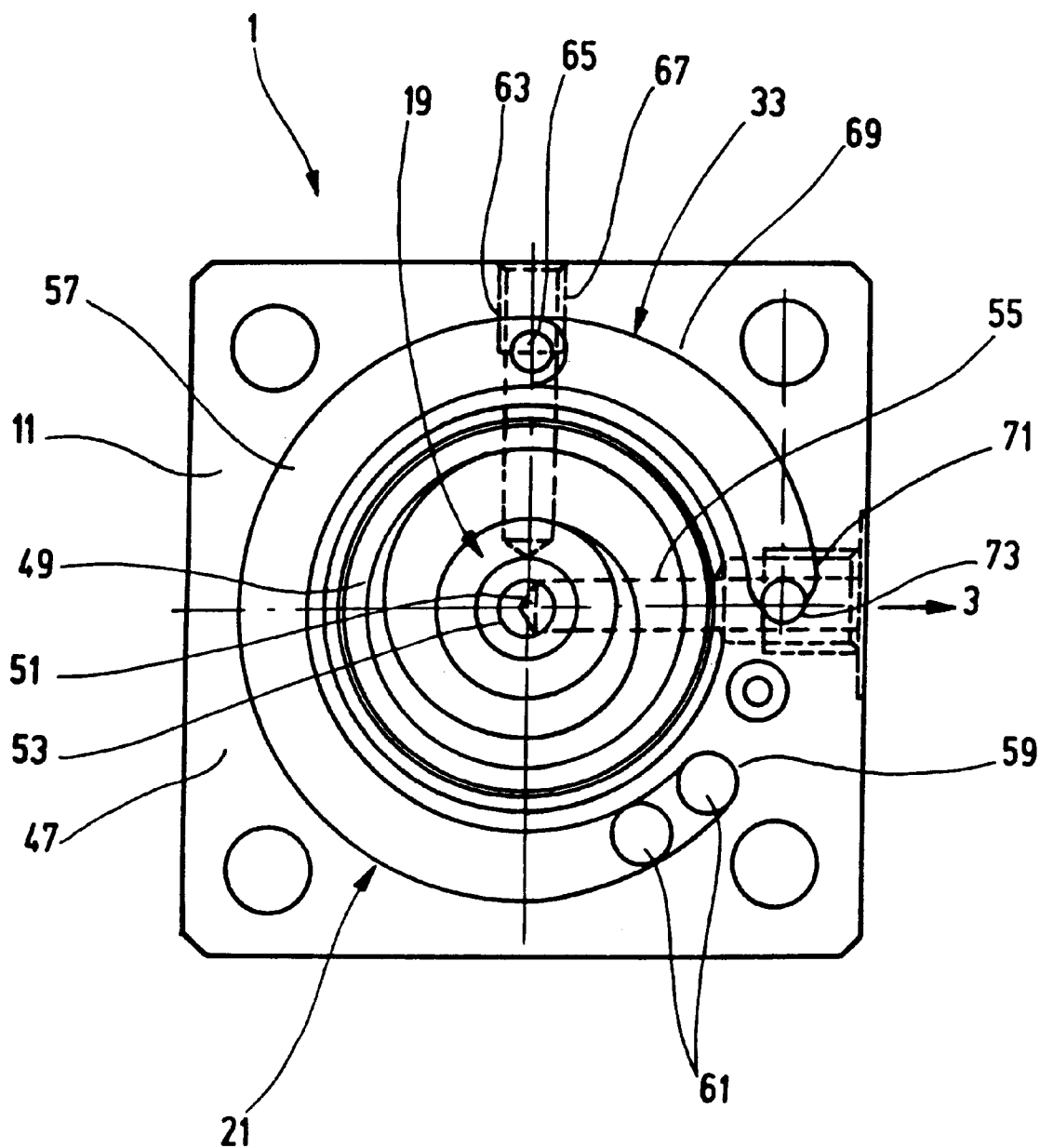
FIG. 5 is a top view of an open regulator according to the embodiments shown in FIGS. 1, 3 and 4.

The hydraulic diagram according to FIG. 1 shows a regulator 1 that serves for regulating a medium flow that is supplied to a consumer, in particular, a not-shown hydrostatic or aerostatic pocket, via a medium connection 3. Pockets of this type are used in hydrostatic or aerostatic bearings, nuts for threaded spindles and guidances. The regulator 1 is supplied with a liquid medium, preferably oil, by a pump 7 that is driven by a motor 5 via a supply line 9. The pump draws liquid medium from a medium supply 37 which is protected by a check valve 35. Three pressure chambers that are separated by a control element 15 that can be moved against the force of a spring element 13 are provided in the schematically illustrated housing 11 of the regulator. The first pressure chamber 17 is directly connected to the pump 7 via the supply line 9 and charged with a first pressure level p1. The second pressure chamber 19 is connected to the supply lines 9 and consequently the pump 7 via a—preferably invariable—first flow resistance 21. If the medium flows through the first flow resistance 21, the second pressure chamber 19 is charged with a second pressure level p2. The control element 15 forms a variable second flow resistance 25, in this case, in cooperation with a schematically illustrated control piston 23. This variable second flow resistance separates the second pressure chamber 19 from a third pressure chamber that is charged with a pressure level p3 and formed by the fluid connection 3 that leads to the not-shown pocket. During the operation of the pump 7, a fluid is conveyed into the second pressure chamber 19 via the supply lines 9 and the first flow resistance 21. The fluid is conveyed from the second pressure chamber into the medium or fluid connection 3 and subsequently to the pocket via the variable second flow resistance 25, namely an exit gap 27 that is influenced by the control element 15. The first flow resistance 21 causes a pressure drop during the operation of the regulator 1, i.e., the second pressure level p2 in the second pressure chamber 19 is lower than the first pressure level p1 in the first pressure chamber 17. The variable second flow resistance 25 also causes a pressure drop such that the pressure level p3 in the fluid connection 3 which corresponds to the pressure in the hydrostatic pocket is lower than p2.

FIG. 1 shows that the control element 15 is charged with the pressure p1 in the first pressure chamber 17, the pressure p2 in the second pressure chamber 19 as well as the pressure p3 in the third pressure chamber or the medium connection 3. In addition, the force of the spring element 13 acts upon the control element 15 in such a way that the spring force acts in the same direction as the compressive forces resulting from the pressure levels p2 and p3.

In the stationary mode of the regulator, i.e., at a constant pump pressure p1 and a constant pressure p3, the sum of the forces resulting from the three aforementioned pressures and the spring force acting upon the control element 15 is equal to zero. If the pressure p2 drops, e.g., due to a defect, while the pressures p1 and p3 remain constant, the control element 15 would move to the right in FIG. 1 due to the prevailing pressure p1, and the size of the variable second flow resistance 25 would be increased such that the sum of the forces acting upon the control element 15 is again equal to zero, i.e., the pressure p2 again reaches its original value. If p2 would be increased due to a defect, the aforementioned processes would be reversed. This means that the regulator 1 adjusts a constant pressure p2, i.e., a constant differential pressure (p1–p2), via the first flow resistance 21 as well as a constant flow through this first flow resistance 21 and consequently through the regulator 1 if the pressures p1 and p3 remain constant. If the pressure p3 in the third pressure chamber formed by the fluid connection 3 and consequently in the hydrostatic pocket is changed sufficiently slowly such that dynamic forces can be neglected, the sum of forces resulting from the three pressures and the spring force is also equal to zero in this case. This means that a lower pressure p2, i.e., a higher differential pressure (p1–p2), and consequently a higher flow quantity Q are assigned to a higher pressure p3.

The regulator 1 illustrated in FIG. 1 comprises a bypass 29 that is formed by a connecting line 31. This connecting line is connected to the fluid connection 3 and to the supply line 9 via the first flow resistance 21. The bypass 29 is provided with a third flow resistance 33 that is realized in the form of fixed-also adjustable—throttle. The pocket that is connected to the medium connection 3 is supplied with fluid via the third flow resistance 33 in the bypass 29 as well as the variable second flow resistance 25 that is realized in the form of a control piston 23. The previous explanations apply analogously to gaseous media.

If pressure changes occur in the hydrostatic or aerostatic pocket, the control element 15 that, for example, is realized in the form of an elastic plate carries out greater control movements due to the partial fluid flow that is conveyed to the consumer via the bypass 29. Consequently, the regulator 1 is no longer as susceptible to vibrations as conventional regulators.

The hydraulic diagram according to FIG. 2 shows a second embodiment of a regulator 10 for regulating a medium flow. This regulator is designed almost identically to the regulator 1 explained previously with reference to FIG. 1. Identical components are identified by identical reference numerals, i.e., we refer to the previous explanation of FIG. 1. In the following description, it is assumed that the medium flow influenced by the regulator 10 pertains to a fluid flow.

The regulator 10 differs from the embodiment according to FIG. 1 due to the fact that the bypass 29 is eliminated. In this case, the first pressure chamber 17 is connected to a gas volume 39 that, for example, is enclosed in a reservoir 41 or hydraulic accumulator, respectively, in pressure-tight fashion. The reservoir 41 is connected to the supply line 9 and consequently the pump 7 via a supply line 43. The two media in the hydraulic accumulator are separated by a largely gas-tight and fluid-tight membrane in this embodiment. The region of the hydraulic accumulator which is filled with gas (gas volume 39) is connected to the first pressure chamber 17 via a connecting line 45, wherein the region filled with fluid is connected to the supply line 43. The first pressure chamber 17 is preferably filled with gas in such a way that the gas directly adjoins the control element 15 or is merely separated from the control element by a sealing element. In this embodiment, the control element 15 is charged with the fluid in the second pressure chamber 19 as well as the gas volume 39 that continues into the first pressure chamber 17.

Since the gas of the gas volume 39 and consequently in the first pressure chamber 17 is compressed to the pressure level p1 due to the fluid that flows into the hydraulic accumulator when the pump 7 is switched on, the first pressure level p1 generated by the pump 7 also acts in the first pressure chamber 17 of the regulator 10 shown in FIG. 2, wherein the second pressure level p2 acts in the second pressure chamber 19 and the third pressure level p3 acts in the third pressure chamber 3.

The previous explanation of FIG. 2 was based on the fact that a consumer, e.g., a hydrostatic pocket, is supplied with a (hydraulic) fluid via the regulator 10, i.e., the medium supply is realized by means of a motor-driven fluid pump. In this case, the first pressure chamber 17 is filled with or connected to a gas volume.

However, the regulator 10 may also be used in connection with a consumer that is supplied with a gaseous medium from a corresponding medium supply, compressor or gas supply, e.g., an aerostatic pocket. In this case, the first pressure chamber 17 and the chamber 39 are not filled with a gas, but rather a fluid. Accordingly, the regions of the hydraulic accumulator which are filled with gas and fluid are interchanged.

Consequently, the media used in the regulator 10 according to FIG. 2 can be interchanged such that the regulator may be used for supplying hydrostatic pockets as well as aerostatic pockets.

FIG. 3 shows a hydraulic diagram of a regulator that largely corresponds to the regulator described previously with reference to FIG. 1. Identical components are identified by identical reference numerals, i.e., we refer to the previous description of FIG. 1. In contrast to the regulator shown in FIG. 1, the bypass is eliminated in FIG. 3. In FIG. 3, the first pressure chamber 17 is connected to the pump 7 that serves as the medium supply via a fourth flow resistance 34. If the first pressure chamber 17 is designed relatively large, a certain resilience of the first pressure chamber 17 is attained—as with the gas volume in FIG. 2—and the first pressure chamber 17 is decoupled from vibrations in the line between the pump 7 and the regulator by the fourth flow resistance 34. Consequently, pressure pulsations in the three pressure chambers can also be counteracted with this embodiment such that a regulator with damped vibrations is attained.

FIG. 4 shows a hydraulic diagram of an additional embodiment of a regulator. Components that were also used in the hydraulic diagram according to FIG. 1 are identified by identical reference numerals. In this respect, we refer to the description of FIG. 1. In contrast to the regulator shown in FIG. 1, the bypass is eliminated in FIG. 4. However, the first pressure chamber 17 in FIG. 4—in contrast to FIG. 1—is limited relative to the atmospheric pressure or a gas volume with a lower pressure than the pressure of the medium supply by an elastic spring element 16, in this case, an additional movable piston 20 that is supported on a spring 18 or an elastic plate that is connected to the housing 11 in pressure-tight fashion. Due to these measures, a certain resilience of the first pressure chamber 17 is attained, i.e., pressure pulsations in the three pressure chambers can also be counteracted with this embodiment such that a regulator with damped vibrations is attained.

FIG. 5 shows a regulator 1 that is realized in accordance with the hydraulic diagram shown in FIG. 1. Identical components are identified by identical reference numerals, i.e., we refer to the description of FIG. 1.

The regulator 1 shown in FIG. 5 comprises a housing 11 with a circular depression 49 that originates at the surface 47. This depression is covered by a not-shown control element. In this case, the control element 15 is realized in the form of a circular elastic plate that divides the depression 49 into a first pressure chamber 17 and a second pressure chamber 19. For this purpose, the elastic plate is arranged in the depression 49 in at least largely pressure-tight fashion.

In this embodiment, a circular projection is provided in the center of the depression 49. This projection comprises a central bore 51 that forms part of the fluid connection 3 and an annular surface 53 that surrounds the bore 51. The control element 15 or the elastic plate forms the variable second flow resistance 25 in cooperation with the annular surface 53. The annular surface 53 lies underneath the plate that serves as the control element 15. However, the annular surface does not contact the plate that serves as the control element 15 if the plate is installed into the regulator 1 and not subjected to a pressure because the annular surfaces 53 lies in a different plane than the support surface for the plate.

The central bore 51 is intersected by a channel 55 that extends parallel to the plane of projection and the surface 47. The medium connection 3 can be connected to this channel in suitable fashion as indicated by an arrow in FIG. 5.

A first groove 57 that extends over a circular arc section is arranged in the surface 47 of the housing 11. The medium conveyed by the pump 7 (see FIG. 1) is introduced at the first end 59 of this groove via bores 61. A channel 65 that extends perpendicular to the plane of projection is provided at the second end 63 of the first groove 57, wherein said channel ends in a connecting channel 67 that extends parallel to the surface 47 and forms a connection between the bores 61 and the first groove 57 on one side and the connecting channel 67 on the other side. The dimensions of the first groove 57 are chosen such that it acts as the first flow resistance 21. The medium conveyed through the first flow resistance 21 flows into a region of the depression 49 which is covered by the not-shown plate via the channel 65 and the connecting channel 67. This region of the depression forms the second pressure chamber 19. Consequently, the second pressure chamber 19 is supplied with the medium via the bores 61, the first groove 57 that forms the first flow resistance 21 and extends in the shape of a circular arc, the channel 65 and the connecting channel 67. The medium is conveyed from the second pressure chamber 19 into the central bore 51 through the gap between the plate that forms the control element 15 and the annular surface 53, and from the central bore into the medium connection 3 via the channel 55.

The depression 49 is designed so low that a residual depression that forms the first pressure chamber 17 remains relative to the surface 47 once the plate is installed. This first pressure chamber is closed with a cover that is attached onto the surface 47 and directly connected to the medium supply or the pump 7, in suitable fashion.

The first groove 57 that, for example, extends over a circular arc section of approximately 225° continues in the form of a second groove 69 in the surface 47 which extends in the shape of a circular arc over an angle of approximately 90°. The second groove 69 forms a connection between the first flow resistance 21 realized by the first groove 57 and the channel 55. For this purpose, the end 71 of the second groove 69 which is situated opposite to the channel 65 is connected to the channel 55 and consequently the medium connection 3 via a channel 73 that extends perpendicular to the plane of projection. The medium to be regulated flows to the second groove 69 that forms the third flow resistance 33 via the channels 61 and the first groove 57 that forms the first flow resistance 21. The medium flows to the medium connection 3 via this third flow resistance 33. The first groove and the second groove are realized in such a way that the flow resistance of the first groove 57 or the first flow resistance 21 is smaller than the flow resistance of the second groove 69 that forms the third flow resistance 33. In order to adjust the various throttle or resistance values, a depth of 2/10 mm is, for example, chosen for the first groove, and a depth of 1/10 mm is chosen for the second groove 69.

Figure 6:
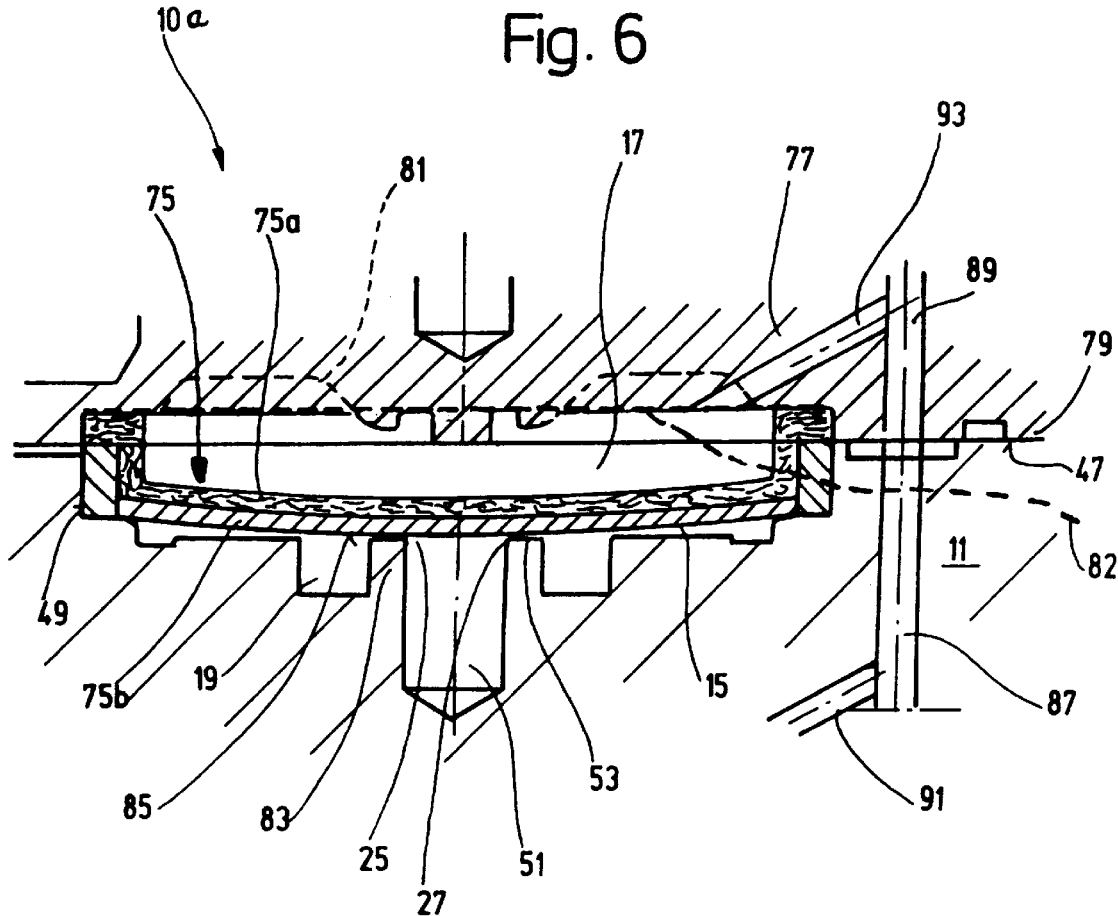
FIG. 6 is a cross section through an additional embodiment of a regulator.

FIG. 6 shows a cross section through a regulator 10a, incorporating identical components identified by the same reference numerals as those applied in the preceding figures. However, now all components of FIG. 2 are visible in FIG. 6.

The regulator 10a comprises a housing 11 with a depression 49. This depression is divided into two pressure chambers by an elastic plate 75 consisting of the elastic plate 75b that forms the control element 15 and the "cup membrane" 75a that adjoins this elastic plate and is used as a seal. A first pressure chamber 17 that is charged with the first pressure level p1 is formed above the elastic plate 75, and a second pressure chamber 19 that is charged with the second pressure level p2 is formed underneath the elastic plate 75 or the control element 15.

The first pressure chamber 17 is closed with a cover 77 that tightly adjoins the surface 47. The cover 77 may be formed by an additional regulator, i.e., it is possible to mount a series of regulators directly onto one another such that a very compact structural shape is realized. The cover 77 may be optionally provided with a depression 81 in its side 79 that faces the surface 47. This depression is directly connected to and consequently enlarges the first pressure chamber 17. The depression 81—as indicated by broken lines—may also be realized more largely and enclose a membrane 82 that is indicated by dots and separates a gas volume from a fluid volume inside of the depression such that a reservoir or hydraulic accumulator is integrated into the regulator 10.

A cylindrical projection 83 that surrounds a central bore 51 is provided at the base of the depression 49 in the housing 11. This central bore—as described previously with reference to the regulator 1 shown in FIG. 5—is connected to the medium connection 3 via a channel 55 that is not visible in the cross section shown. The bore 51 is charged with the pressure level p3 that also acts in the medium supply 3.

The projection 83 forms an annular surface 53 that surrounds the bore 51 and forms the variable second flow resistance 25 explained previously with reference to FIGS. 1 and 2 in cooperation with the underside 85 of the elastic plate 75b. Once again, we expressly refer to the fact that the same basic design features are found in both of the regulators 1 and 10. Further the design of the regulator of FIG. 5 and the design of the regulator of FIG. 6 are also similar in many respects.

As described previously with reference to FIG. 2, the regulator 10 shown in FIG. 6 has a first pressure chamber 17 that is connected to a gas volume 39. In this case, the first pressure chamber is filled with gas. This means that the control element 15 realized in the form of an elastic plate 75b is in contact with a gas volume via the seal that adjoins the plate 75b and is realized in the form of a cup membrane 75a on the side that faces the first pressure chamber 17. Fluid or oil that serves for supplying the hydrostatic pocket is situated on its upper side that faces the second pressure chamber 19. Both pressure chambers have a different pressure level, wherein the first pressure level p1 of 5 the first pressure chamber 17 is higher than the pressure level p2 of the second pressure chamber 19 due to the flow resistance 21 described previously with reference to FIGS. 1 and 2.

The control element 15 that is realized in the form of an elastic plate 75b is deflected or moved more or less strongly as a function of the differential pressure of the two pressure chambers 17 and 19, i.e., the exit gap 27 formed between the underside 85 of the plate 75b and the annular surface 53 has different heights h. The fluid quantity that flows through the exit gap 27 depends on the height of the gap and the variable second flow resistance which results from the more or less strong deflection of the control element 15, i.e., the differential pressure in the pressure chambers 17 and 19. It is quite obvious that a variable second flow resistance 25 or an exit gap with a variable height h is realized in this case. The elastic plate 75b replaces the piston/spring system illustrated in the hydraulic diagrams and forms the control element 15.

A supply line 87 that extends perpendicular to the surface 47 and transforms into a corresponding supply line 89 in the cover 77 is arranged in the housing 11. If several regulators are directly coupled to one another such that the regulator that lies on the surface 47 forms the cover of the regulator situated underneath, a closed supply line system formed by the supply lines 87 and 89 that are coupled to the medium supply or a gas volume (see, for example, FIGS. 1 and 2) is obtained. Line sections 91 and 93 originate at the supply lines 87 and 89, wherein the line section 93 ends in the first pressure chamber 17. The line section 91 in the housing 11 is assigned to a pressure chamber that forms part of a not shown regulator arranged underneath the regulator 10a and forms the first pressure chamber 17. The line section 93 connects the supply line 89 in the cover 77 to the first pressure chamber 17.

Figure 7:
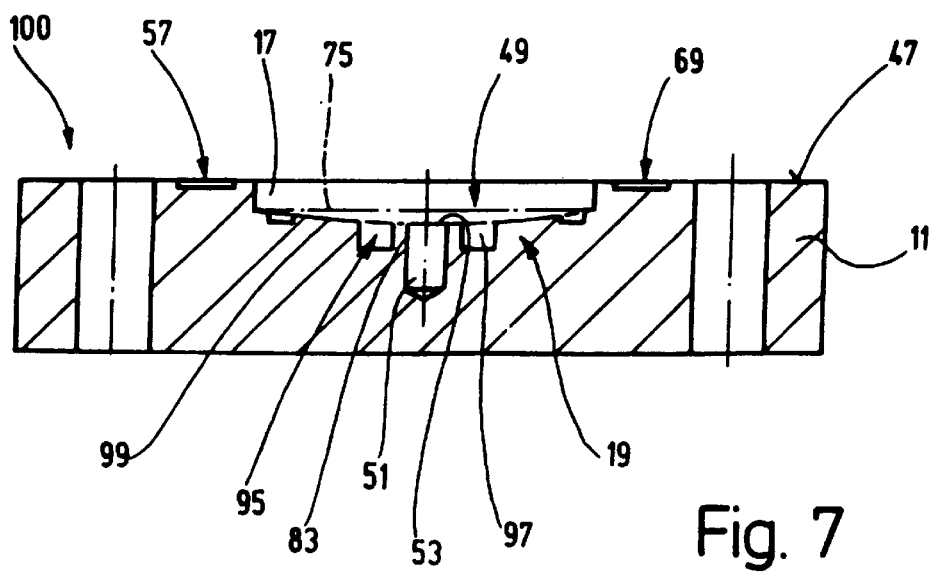
FIG. 7 is a cross section through an additional embodiment of a regulator.

FIG. 7 shows a section through one additional embodiment of a regulator 100 that, in principle, is designed identically to the regulator described previously with reference to FIGS. 5 and 6, i.e., we refer to the previous description. Identical components are identified by identical reference numerals.

In the regulator 100, the bottom or base of the depression 49 in the housing 11 follows a curved contour 95. The contour 95 is adapted to the shape of a moved or deflected elastic plate 75. However, this plate is not shown in FIG. 7 so as to provide a better overview. FIG. 6 shows that the elastic plate 75 is moved downward in the direction toward the projection 83 if a differential pressure exists between the pressure chambers 17 and 19 as well as between the pressure chamber 17 and the medium connection 3. In this case, the exit gap 27 is reduced in comparison to the relaxed idle position of the elastic plate. It must be ensured that an exit gap exists between the underside of the plate and the annular surface 53 in the deflected state of the plate.

The depression 49 is surrounded by an annular groove that is also arranged in the surface 47 of the housing 11. This annular groove lies at a distance from the depression 49 and consequently is hydraulically separated from said depression if a cover 77 (see FIG. 6) is attached to the surface 47 in pressure-tight fashion. The section through the housing 11 was chosen such that the second groove 69 mentioned previously with reference to FIG. 5 is situated to the right of the depression 49, wherein the first groove 57 is situated to the left of the depression 49. The sectional representation according to FIG. 7 indicates that the second groove 69 has a significantly smaller depth than the first groove 57, i.e., the flow cross section of the third flow resistance 33 formed by the second groove is significantly smaller than the first flow resistance 21 formed by the first groove 57.

The base of the depression 49 comprises an annular channel 97 that surrounds the projection 83 and is surrounded by an annular surface 99. The surface of the annular surface 99 and the surface of the annular surface 53 also follow the contour 95 such that narrow gaps, the width of which depends on the radial width of the annular surfaces, are formed between the annular surfaces and the underside of the plate if the elastic plate inserted into the depression 49 is deflected. The deflection of the plate is damped by the fluid contained in the second pressure chamber 19 which is displaced through these gaps.

It is quite obvious that damping surfaces can be assigned to the surfaces of the plate that acts as the control element and separates the first pressure chamber 17 from the second pressure chamber 19, wherein the contour of the damping surfaces is adapted to the contour of the deflected plate, and wherein the damping surfaces form narrow gaps in cooperation with the surface of the plate. During a deflection of the plate, the hydraulic medium must flow through these narrow gaps, i.e., the aforementioned damping effect is attained. The damping is independent of whether a hydraulic medium or a gas is present in the first pressure chamber 17.

In the embodiment according to FIG. 7, it is also possible to fill the first pressure chamber 17 that is situated above the elastic plate 75 indicated by broken lines with a gas. If the first pressure chamber 17 is filled with gas, the second groove 69 and the third flow resistance 33 can be eliminated. However, it would also be conceivable to combine the third flow resistance 33, i.e., the bypass, with the gas volume and realize the base of the depression 49 in the form of a downward curvature such that the contour 95 is formed. However, the first pressure chamber 17 may also be filled with a hydraulic fluid as described previously with reference to FIG. 1. In this case, a contour body, the surface of which approximately corresponds to the shape of the deflected elastic plate, may be arranged in the pressure chamber 17 such that a narrow gap that causes a damping effect is formed between the plate and the contour body.

The regulator type described previously with reference to FIGS. 1–7 pertains to a so-called progressive volume regulator for gaseous and liquid media which increases the volume flow supplied to the consumer if the pressure in the connection to the consumer, e.g., in the medium connection 3, is increased. Consequently, the described regulator differs from conventional fixed throttles that decrease the flow-through quantity as the pressure increases.

It was determined that it is advantageous to arrange the aforementioned regulator in the immediate vicinity of the consumer or hydrostatic/aerostatic pocket, respectively. In this case, vibrations of the regulator can be prevented in particularly effective fashion because the kinetic energy of the fluid and the compressibility of the medium in the medium connection 3 are very low.

The previous description indicates that two or more of the previously described measures or devices can be utilized in order to reduce the tendency of the regulator to vibrate. For example, a bypass may be combined with a gas volume that is assigned to a pressure chamber for damping purposes. It is also possible to provide one or more damping surfaces that reduce the tendency of the control element to vibrate in the aforementioned embodiments.

What is claimed is:

1. Regulator for regulating a medium flow that is supplied to a static fluid pocket of a bearing, the regulator having pressure chambers that are separated by a control element that can be moved against the force of a spring element, wherein a first pressure chamber that is charged with a first pressure level is directly connected to the medium supply, a second pressure chamber that is charged with a second, lower pressure level is connected to the medium supply via a first flow resistance, and a third pressure chamber that is charged with a third pressure level that corresponds to the pressure in the hydrostatic or aerostatic pocket is connected to the hydrostatic or aerostatic pocket, wherein the control element forms a variable second flow resistance between the second and third pressure chamber which influences the medium flow supplied to the pocket, and wherein the amount of the aforementioned variable second flow resistance is increased due to the force exerted by the first pressure chamber and reduced due to the spring force as well as the forces exerted by the second and third pressure chamber, wherein a bypass with a third flow resistance is provided, wherein the bypass is connected to the hydrostatic or aerostatic pocket and to the medium supply via the first flow resistance.

2. Regulator according to claim 1, wherein the third flow resistance is substantially invariable.

3. Regulator according to claim 1, wherein the third flow resistance is designed or adjusted to be sufficiently large that, at a pressure equal to zero, the medium flow that flows through this flow resistance approximately corresponds to the medium flow that would flow through the regulator without the bypass and the third flow resistance at the aforementioned pressure in the pocket.

4. Regulator according to claim 1, wherein the third flow resistance is realized in the form of a groove in the surface of the regulator housing.

5. The regulator of claim 1 wherein the first pressure chamber is filled with a fluid which is charged with the pressure generated by the medium supply.

6. Regulator for regulating a medium flow that is supplied to a nut for threaded spindles or a guidance from a medium supply, the regulator having pressure chambers that are separated by a control element that can be moved against the force of a spring element, wherein a first pressure chamber that is charged with a first pressure level is directly connected to the medium supply, a second pressure chamber that is charged with a second, lower pressure level is connected to the medium supply via a first flow resistance, and a third pressure chamber that is charged with a third pressure level that corresponds to the pressure in the hydrostatic or aerostatic pocket is connected to the hydrostatic or aerostatic pocket, wherein the control element forms a variable second flow resistance between the second and third pressure chamber which influences the medium flow supplied to the pocket, and wherein the amount of the aforementioned variable second flow resistance is increased due to the force exerted by the first pressure chamber and reduced due to the spring force as well as the forces exerted by the second and third pressure chamber, wherein a bypass with a third flow resistance is provided, wherein the bypass is connected to the hydrostatic or aerostatic pocket and to the medium supply via the first flow resistance .

7. Regulator for regulating a medium flow that is supplied to a static fluid pocket of a bearing, the regulator having pressure chambers that are separated by a control element that can be moved against the force of a spring element, wherein a first pressure chamber that is charged with a first pressure level is directly connected to the medium supply, a second pressure chamber that is charged with a second, lower pressure level is connected to the medium supply via a first flow resistance, and a third pressure chamber that is charged with a third pressure level that corresponds to the pressure in the hydrostatic or aerostatic pocket is connected to the hydrostatic or aerostatic pocket, wherein the control element forms a variable second flow resistance between the second and third pressure chamber which influences the medium flow supplied to the pocket, and wherein the amount of the aforementioned variable second flow resistance is increased due to the force exerted by the first pressure chamber and reduced due to the spring force as well as the forces exerted by the second and third pressure chamber, wherein a bypass with a third flow resistance is provided, wherein the bypass is connected to the static fluid pocket and to the medium supply via the first flow resistance and wherein the third flow resistance is realized in the form of a groove in the surface of the regulator housing.

* * * * *